Patented Sept. 25, 1945

2,385,573

UNITED STATES PATENT OFFICE 2,385,573

ENAMELWARE MAKING

Oscar Hommel, deceased, late of Pittsburgh, Pa., by Ernest M. Hommel, Eda H. Goldstein, and The Union Trust Company of Pittsburgh, executors, all of Pittsburgh, Pa., assignors to The O. Hommel Company, Pittsburgh, Pa., a corporation of Pennsylvania No Drawing. Application July 23, 1941,
Serial No. 403,762

5 Claims. (Cl. 117—70)

In the art of enamelware making the practice of overspraying is known. The operation of overspraying, as commonly practised, consists in spreading upon the surface of the article under treatment a layer of slip, and drying the outspread layer to the condition of an incrustation. In the drying the constituent particles of the slip are not fused; it is only the volatile fluid carrier that is driven off. The granular solid material remains as an incrustation. Upon the so outspread and dried layer a second layer of slip is spread, ordinarily by spraying—hence the term overspray. The second layer may be applied by dipping. A second drying follows, and, eventually a firing—that is to say, a fusion—of the whole.

The practice of overspraying—otherwise, for particular reasons and in particular cases, advantageous—is subject to disadvantage. Blemishes of surface are liable to appear in the finished article; and, particularly, oversprayed ware is liable to become blistered in the firing. The inventor has investigated, and in discovering the cure (for which he now seeks patent protection) he has, as he believes, discovered the cause of such prejudicial blistering.

He has discovered (and herein lies his invention) that if in the course of the operation of overspraying, the nether layer, upon which eventually the overspray is laid, include an adequate content of silicate of soda, the disadvantage will be overcome; the surface of the finished article will be of unblistered smoothness.

The reason for the defect that is liable to attend the practice of overspraying as heretofore it has been conducted he has perceived to lie in the fact that the nether layer when dried to an incrustation is porous; the oversprayed slip includes a liquid carrier (ordinarily water), and the liquid of the carrier is in part absorbed by the underlying porous material. The ensuing drying step may fail completely to drive off the liquid that has so penetrated into the nether layer, and in the ultimate firing step the residue of moisture (or other liquid), being vaporized, causes blistering.

Silcate of soda is a highly hygroscopic salt. Present in the composition of the nether layer, it remains after drying in relatively dehydrated condition, filling the pores. When to the surface of the nether layer the overspray is applied, the silicate of soda within the nether layer excludes the water of the overspray from penetration. If there be any absorption, the water is retained at or near the interface. The consequence and effect are that, in the ensuing drying step, the water is more readily and more completely driven off; the article is thoroughly desiccated; and is susceptible to firing without blistering.

The quantity of silicate of soda that he has found to be effective to the ends described will preferably range from 2 to 4% of the slip in which it is compounded, and in any case its benefits will be fully realized within a range of 2–10%.

A typical formula for the mill charge that is ground to form the slip of the nether layer is as follows:

| | Parts by weight |
|---|---|
| Frit | 100 |
| Clay | 7 |
| Sodium silicate | 3–6 |
| Magnesium carbonate | ¼ |
| Water | 40 |
| Total | 150¼–153¼ |

Sodium silicates of various grades and compositions may be employed; that which he has used with success (and contemplated in the foregoing formula) has in composition $Na_2O$, 6.4%; $SiO_2$, 24.7%; $H_2O$, 68.9%.

The nether coat so compounded, when applied and dried, is hard, does not absorb water, and does not lift in the handling that is incident to manufacture.

The magnesium carbonate of the foregoing formula will be recognized to be a setting-up agent such as is familiar to the industry. It is typical, and the industry knows alternatively such substances as magnesium sulfate and borax, that, in known quantities, may be employed as setting-up agents. Again, the setting-up agent may or may not be employed as circumstances dictate.

He claims as his invention:

1. The refinement herein described of the production of enamelware by spreading successively and drying successively two superposed layers of slip and firing the whole, which consists in including in the composition of the slip of the nether layer a content of 2–10% of silicate of soda, whereby blistering in the ultimate firing of the article is prevented.

2. The refinement herein described of the production of enamelware by spreading successively and drying successively two superposed layers of slip and firing the whole, which consists in compounding the slip of the nether layer according to the following formula:

| | Parts by weight |
|---|---|
| Frit | 100 |
| Clay | 7 |
| Sodium silicate | 3-6 |
| Water | 40 |

3. The process of making enamel-ware, which comprises coating an article to be enameled with an initial layer of an enameling slip, drying the said layer, applying a further coating of the slip to the dried initial layer, drying the further coating, and firing until the coatings become fused, the slip composing the initial layer including effective amounts of sodium silicate to prevent blistering of the coatings during firing, but not more than substantially ten per cent thereof, and not less than substantially two per cent thereof.

4. In the production of oversprayed enamelware, the improvement which consists in incorporating effective amounts of sodium silicate in a slip composition for preventing blistering of enamel coatings on an article being enameled, the sodium silicate-containing slip being applied as an initial coating, and containing from substantially two per cent to substantially ten per cent of sodium silicate.

5. A blister-free oversprayed enameled article having effective amounts of sodium silicate included in the slip composition employed for coating, for preventing blistering of the enameled coating during firing, the sodium silicate being present in amounts from substantially two per cent to substantially ten per cent.

ERNEST M. HOMMEL,
EDA H. GOLDSTEIN,
THE UNION TRUST COMPANY
      OF PITTSBURGH,
By ARTHUR M. SCULLY,
     Vice President,
Executors of the Estate of Oscar Hommel, Deceased.